(12) United States Patent
Bhardwaj et al.

(10) Patent No.: US 6,947,653 B2
(45) Date of Patent: Sep. 20, 2005

(54) WAVEGUIDE STRESS ENGINEERING AND COMPATIBLE PASSIVATION IN PLANAR LIGHTWAVE CIRCUITS

(75) Inventors: Jyoti Kiron Bhardwaj, Cupertino, CA (US); Robert James Brainard, Sunnyvale, CA (US); Zi-Wen Dong, Union City, CA (US); David Dougherty, Sunnyvale, CA (US); Erik W. Egan, Oakland, CA (US); Niranjan Gopinathan, Santa Clara, CA (US); David K. Nakamoto, Sunnyvale, CA (US); Thomas Thuan Nguyen, San Jose, CA (US); Sanjay M. Thekdi, Santa Clara, CA (US); Anantharaman Vaidyanathan, San Jose, CA (US); Hiroaki Yamada, San Jose, CA (US); Yingchao Yan, Milpitas, CA (US)

(73) Assignee: JDS Uniphase Corporation, San Jose, CA (US)

( * ) Notice: Subject to any disclaimer, the term of this patent is extended or adjusted under 35 U.S.C. 154(b) by 224 days.

(21) Appl. No.: 09/977,065

(22) Filed: Oct. 12, 2001

(65) Prior Publication Data

US 2003/0072548 A1 Apr. 17, 2003

(51) Int. Cl.$^7$ ............................ G02B 6/10; G02B 6/13; G02F 1/295
(52) U.S. Cl. .......................... 385/129; 385/10; 385/11; 385/132; 438/31
(58) Field of Search .................... 385/10, 11, 129–132, 385/40; 438/31, 65

(56) References Cited

U.S. PATENT DOCUMENTS

| | | | | |
|---|---|---|---|---|
| 4,781,424 A | * | 11/1988 | Kawachi et al. | 385/132 |
| 4,900,112 A | * | 2/1990 | Kawachi et al. | 385/14 |
| 4,929,302 A | * | 5/1990 | Valette | 216/2 |
| 5,125,946 A | * | 6/1992 | Bhagavatula | 65/106 |
| 5,732,179 A | * | 3/1998 | Caneau et al. | 385/131 |
| 5,799,118 A | * | 8/1998 | Ogusu et al. | 385/14 |
| 5,917,625 A | * | 6/1999 | Ogusu et al. | 385/24 |
| 6,553,170 B2 | * | 4/2003 | Zhong et al. | 385/130 |
| 6,625,370 B2 | * | 9/2003 | Itoh et al. | 385/132 |
| 2001/0007606 A1 | * | 7/2001 | Sasaki et al. | 385/129 |
| 2002/0039474 A1 | * | 4/2002 | Klekamp et al. | 385/129 |

OTHER PUBLICATIONS

Wildermuth et al. "Penalty–free polarisation compensation of SiO2/Si arrayed waveguide grating wavelength multiplexers using stress release grooves" Electronics Letters Aug. 20. 1998 vol. 34 No. 17 p 1661–1663.*
"VLSI Technology", Second Edition, 1988, pps. 258–269.
"Birefringence control in planar waveguides using doped top layers", J. Canning, Optics Communications, May, 2001, pps. 225–228.
"Polarization Insensitive, Low–Loss, Low–Crosstalk Wavelength Multiplexer Modules", C.K. Nadler, et al., IEEE Journal of Selected Topics In Quantum Electronics, vol. 5, No. 5, Sep./Oct. 1999, pps. 1407–1412.
"Birefringence Free Planar Optical Waveguide Made by Flame Hydrolysis Deposition (FHD) Through Tailoring of the Overcladding", A. Kilian, et al., Journal of Lightwave Technology, vol. 18, No. 2, Feb. 2000, pps. 193–198.
"Simple Method of Fabricating Polarisation–Insensitive and Very Low Crosstalk AWG Grating Devices", S.M. Ojha, et al., Electronics Letters, vol. 34, No. 1, Jan. 1998, pps. 78–79.

* cited by examiner

*Primary Examiner*—Edward J. Glick
*Assistant Examiner*—Krystyna Suchecki
(74) *Attorney, Agent, or Firm*—Allen, Dyer, Doppelt, Milbrath & Gilchrist, P.A.

(57) ABSTRACT

A planar lightwave circuit includes at least one optical waveguide core, and at least one feature proximate the core having a stress-engineered property to balance stress and therefore minimize birefringence affecting the core. A protective passivation layer is formed over the core and the feature to be substantially non-interfering with the balanced stress provided by the feature. The stress balancing feature may be an overcladding layer formed over the core, doped to have a coefficient of thermal expansion approximately matched to that of an underlying substrate, to symmetrically distribute stress in an undercladding between the overcladding and the substrate, away from the core. The protective passivation layer is formed to have a coefficient of thermal expansion approximately matched to that of the overcladding. In one exemplary embodiment, the passivation layer is formed from silicon nitride. Related concepts of stress release grooves, and core overetching, are also disclosed.

29 Claims, 6 Drawing Sheets

WAVEGUIDE STRESS ENGINEERING AND COMPATIBLE PASSIVATION IN PLANAR LIGHTWAVE CIRCUITS

FIELD OF THE INVENTION

The present invention relates to protective passivation layers for planar lightwave circuits. More particularly, the present invention relates to passivation techniques which preserve the stress engineered environment of underlying optical waveguide layers.

BACKGROUND OF THE INVENTION

Fiber optic communication links have been conventionally employed in long-haul, point-to-point networks with controlled environments at all interface points. Such highly controlled, "central office" surroundings usually offer relatively benign operating environments (temperature, humidity, mechanical) for components. Consequently, highly functional components could be developed and installed without considering the impact of other, more extreme environments.

Recent technological advances, coupled with increasing bandwidth demand, are rapidly expanding the use of fiber optic components beyond the "central office" and into potentially harsher environments. For example, dense wavelength division multiplexing (DWDM) enables the transmission of multiple, independent wavelength streams across a single fiber. Predictably, this capability has resulted in the requirement to add or drop these optical channels along the previously untapped long lengths of fiber (and outside of the central office environment) to provide access to the individual wavelength streams. Optical add/drop multiplexers (OADMs) are employed for this function, enabled by arrayed waveguide grating (AWG) components for filtering and forwarding individual wavelengths.

In addition to these technological advances, simple market forces are pushing fiber networks beyond central offices and into the diverse terrain of "metro" markets. This ever-increasing need for bandwidth which only fiber can deliver is resulting in the widespread deployment of fiber networks, and their associated components, into the harsher, less environmentally controlled conditions present in the metro market.

The demands placed on component designers now reach far beyond optical performance, and into the realms of thermal, humidity and mechanical insulation. Certain qualification standards (e.g., Telcordia) exist for reliability of optical components, and many customers require qualification under these standards. AWGs however are thin, fragile chips with narrow waveguides produced using planar lightwave circuit (PLC) processing techniques. The various processing tolerances required to meet the requisite optical specifications are already very tight, and in fact get tighter as the need to process more and closer channels increases.

One particular concern for PLC waveguides, including those in AWGs, is their sensitivity to stress imbalances, and the impact of stress imbalances on optical performance. These stresses can be induced by the environmental conditions discussed above, and by the fabrication process itself. Stress-induced birefringence in waveguides leads to unacceptably high polarization dependent loss (PDL) for communication systems.

Waveguides are typically fabricated by forming (e.g., etching) waveguide core patterns over a substrate and undercladding. A doped glass overcladding (e.g., boro-phosphate silicate glass or BPSG) is then formed over the cores, to complete the waveguide formation. Because the materials used for these layers are different, with differing properties (e.g., differing coefficients of thermal expansion (CTEs)), intra-and inter-layer stresses exist and will result in high levels of waveguide PDL.

Techniques have been disclosed to address these problems, such as stress release grooves (SRGs) (see, e.g., Nadler et al, "Polarization Insensitive, Low-Loss, Low-Crosstalk Wavelength Multiplexer Modules," IEEE Journal of Selected Topics in Quantum Electronics, Vol. 5, No. 5, September/October 1999) and tailoring of the overcladding (see, e.g., Kilian et al, "Birefringence Free Planar Optical Waveguide Made by Flame Hydrolysis Deposition (FHD) Through Tailoring of the Overcladding," IEEE Journal of Lightwave Technology, Vol. 18, No. 2, February 2000; and "Simple Method of Fabricating Polarisation-Insensitive and Very Low Crosstalk AWG Grating Devices," Electronics Letters, Vol. 34, No. 1, Jan. 8, 1998). Such techniques are broadly referred to herein as stress management or stress engineering, which in effect "balance" the stress affecting the waveguides. The term "balance" is known to those in the art and used broadly herein to connote any type of active stress management which provides the requisite, advantageous minimization of birefringence. Multiple stress balancing techniques are disclosed herein.

Even assuming that such techniques are employed to manage stress, they are still susceptible to the adverse environmental conditions, discussed above. However, any techniques used to protect the circuit from these environmental conditions must also be compatible, and not interfere with, any stress management techniques employed. Modified annealing techniques for the overcladding have been proposed, but have not produced satisfactory protection. Hermetic packaging of the circuits can also provide protection, but such techniques can be expensive, and subject to long-term failures. To decrease reliance on packaging, what is required are advanced techniques to protect planar lightwave circuits from adverse environmental conditions, while maintaining their stress engineered properties at the chip level.

SUMMARY OF THE INVENTION

These requirements are met, and further advantages are provided, by the present invention which in one aspect is a planar lightwave circuit, along with techniques for its formation and use. The planar lightwave circuit includes at least one optical waveguide core, and at least one feature proximate the core having at least one stress-engineered property to balance stress affecting the core. A protective passivation layer is formed over the core and the feature. The passivation layer is formed to be substantially non-interfering with the balanced stress affecting the core provided by the feature.

The passivation layer has the requisite passivation properties (i.e., protection against environmental conditions against which the devices will be tested), and is compatible with the stress management used in lower circuit layers.

The stress balancing feature may be an overcladding layer formed over the core, doped to balance stress affecting the core. The overcladding is doped to have a coefficient of thermal expansion approximately matched to that of an underlying substrate to thereby symmetrically distribute stress in an undercladding between the overcladding and the substrate, and therefore away from the core. The protective passivation layer is formed to have a coefficient of thermal expansion approximately matched to that of the overcladding such that it is substantially non-interfering with the balanced stress affecting the core provided by the overcladding. In one exemplary embodiment, the passivation layer is formed from silicon nitride.

Another optional stress balancing feature is a stress release groove formed through the overcladding between two cores, which releases and therefore balances stress affecting the two cores. A second overcladding may be formed along walls and a floor of the stress release groove to partially but not completely fill the groove to preserve its stress releasing property, but sufficient to support a generally planar portion of the passivation layer over the groove.

Yet another optional stress balancing feature of the circuit may involve overetched portions of the undercladding, respectively adjacent to opposing lower edges of each core, terminating at a point lower than the cores, to further effect a removal of the stress away from the cores. This lower termination point may correspond with the bottom of the stress release groove to thereby provide an identifiable etch transition point for the stress release groove.

Regardless of the particular selection of stress balancing features, the passivation layer is designed to be non-interfering with their stress balancing properties, while providing all of the benefits of passivation, including its barrier to vapor, chemicals, etc. This barrier protection is becoming increasingly important as optical components are subjected to more adverse environments, and their related reliability standards and testing.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may be best understood by reference to the following detailed description of the preferred embodiment(s) and the accompanying drawings in which:

BEST MODE FOR CARRYING OUT THE INVENTION

Figure 1A:
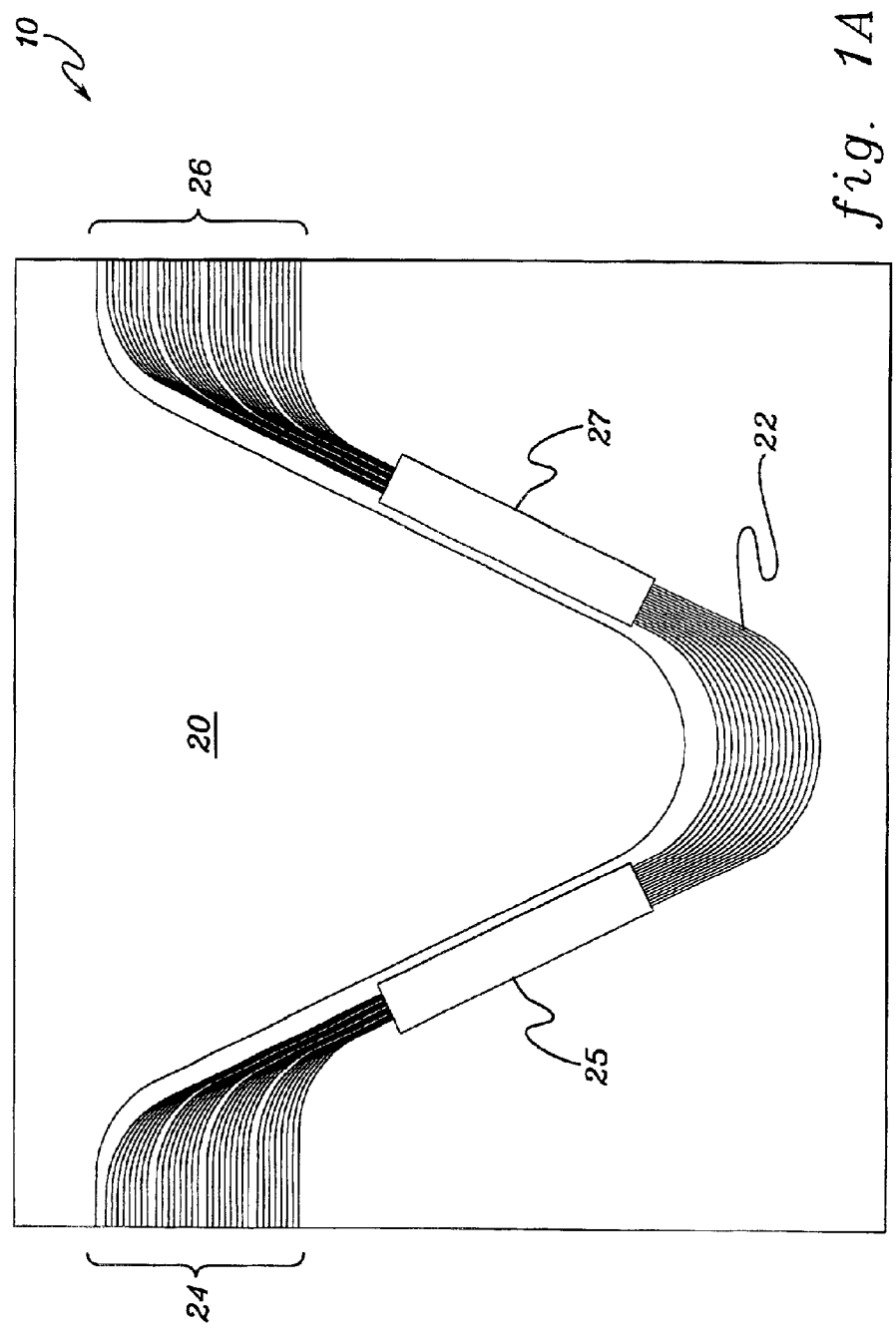
FIG. 1A is a top plan view of a typical planar lightwave circuit (PLC) with an arrayed waveguide grating (AWG) having closely spaced waveguides in several sections thereof.

With reference to FIG. 1A, an exemplary planar lightwave circuit (PLC) 10 is shown in the form of an arrayed waveguide grating (AWG) formed over a substrate 20 (e.g., silicon). As known to those in the art, an AWG uses an array of closely spaced waveguides 22 having carefully controlled, differing path lengths which cause constructive phase interference patterns on the respective optical signals transmitted into and out of the device. This technique is useful for multiplexing or demultiplexing optical signals passed between the array input/focusing region 24/25 to the array output/focusing region 26/27. The tight spatial and thermal tolerances necessary for proper operation of array 20, as discussed above, lead to the requirements for effective packaging and sealing for use in adverse environmental conditions. Moreover, as discussed above, waveguides 22 are highly susceptible to stresses, thus imposing the additional requirement of stress engineering during their fabrication.

Figure 1B:
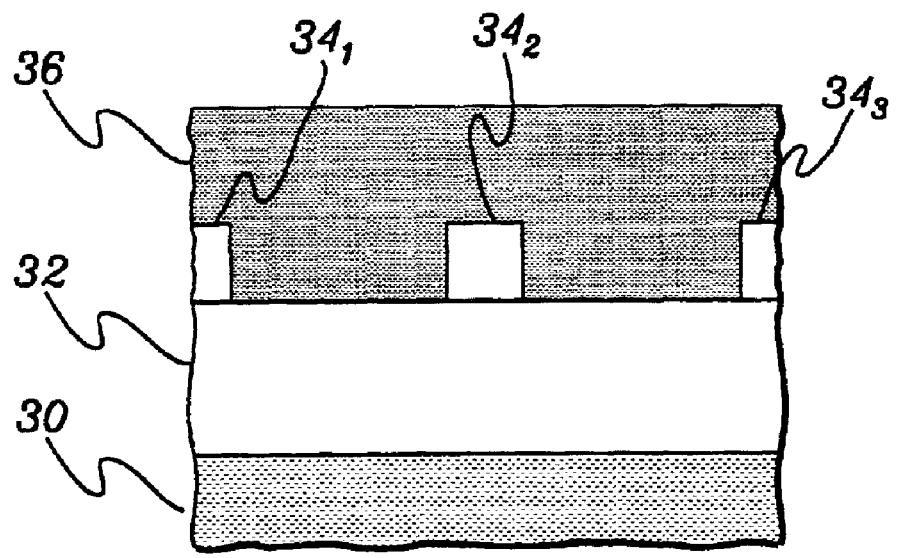
FIG. 1B is a partial cross-sectional view of a typical wafer section showing the cladding layers around cores of several waveguides.

FIG. 1B depicts in partial cross-section a typical wafer-based "silica-on-silicon" waveguide configuration, used for waveguides 22 of FIG. 1A. A buffer layer 32 (e.g., a thermal oxide or $SiO_2$) is formed (e.g., grown or deposited) over a silicon substrate 30. Though various deposition/formation techniques are disclosed herein, those skilled in the art will recognize that any number of known techniques can be used without departing from the principles of the present invention.

Buffer 32 serves as the "undercladding" for the waveguide cores $34_1 \ldots 34_3$, which are formed from a doped silica glass layer (e.g., doped with phosphorous, germanium, nitride, or any other dopant(s) which appropriately modify the refractive index upward—phosphate silicate glass (PSG) being one example). This layer is etched using, e.g., photolithographic mask and reactive ion etching (RIE) techniques. The term "core" is used broadly herein to connote any type of structure within which light is guided. An "overcladding" layer formed from a doped silicate glass layer 36 (e.g., doped with boron, fluorine, phosphorous, germanium, nitride, or any dopant(s) which appropriately modify the refractive index downward—boro-phosphate silicate glass (BPSG) being on example) is then deposited over the cores to complete their waveguide configuration.

As discussed above, techniques are available to ensure that stress imbalances in and around the waveguides do not adversely impact optical performance. These techniques include doping the overcladding, half-lambda compensation plates, and stress release grooves between the waveguides. However, the instant inventors have discovered that the adverse environmental conditions (discussed above) negatively impact these known stress engineering techniques. For example, stress engineering by doping the overcladding reduces the moisture resistance of this layer, and can eventually adversely affect the optical properties of the layer. Any sealing techniques must therefore not only perform their designated task of preventing the flow of moisture, etc.; they must also maintain, and not interfere with, the stress engineered environment of the lower layers.

In accordance with the present invention, a passivation layer is employed to seal the entire waveguide structure. In one embodiment, silicon nitride is used, but other materials are possible. This passivation layer can be used in combination with certain stress engineering techniques employed in the lower layers. As discussed below, the composition of this layer, and its deposition process, are specially tailored to avoid interfering with the stress balancing in the lower layers. The present invention also extends to certain improvements to the stress engineering techniques themselves.

Figure 3:
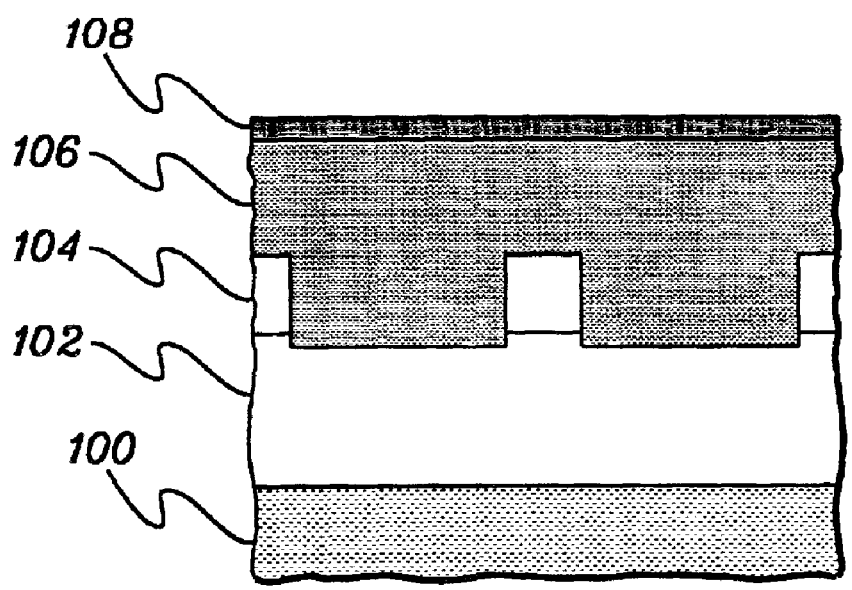
FIG. 3 depicts in cross-section a first waveguide configuration of the present invention including a passivation layer.
Figure 2A:
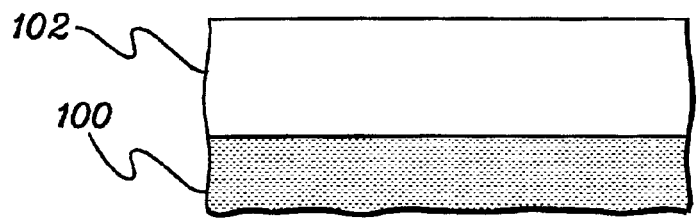
FIGS. 2A–D depict in cross-section the processing steps used to arrive at certain waveguide configurations in accordance with the present invention.
Figure 2B:
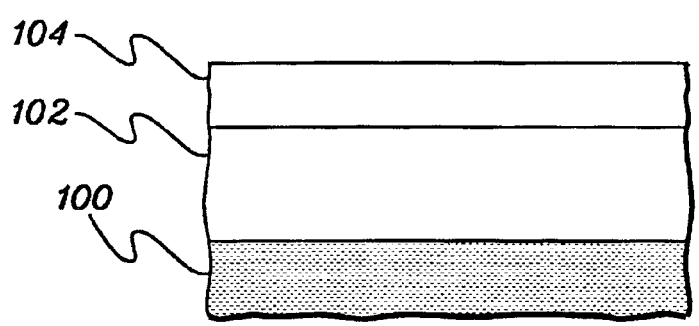
Figure 2C:
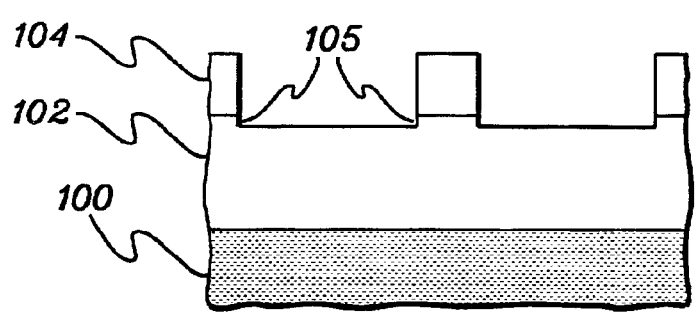

FIGS. 2A–2D depict in partial cross-sectional view certain exemplary processing steps used to realize a first embodiment of the present invention, shown in FIG. 3. In FIG. 2A, a planar (e.g., thermal oxide) buffer layer 102 is shown formed over a silicon substrate 100. In FIG. 2b the planar waveguide core layer 104 (e.g., PSG) is shown formed over layer 102, which is then etched into the individual waveguide cores of FIG. 2C. Conventionally, this etching uses the underlying buffer layer 102 as an etch transition point (i.e., a material transition which can be detected during etching and therefore used to control the end point of the etch), but in accordance with one (optional) aspect of the present invention, this etching step continues into this buffer layer creating the "overetched" regions 105. This overetching has been shown to relieve some waveguide stress, thus contributing to the stress engineered environment of the present invention. As discussed below, the stress field present in layer 102 results from, e.g., a CTE mismatch between layers 100 and 102. Overetching removes certain high stress points (near the lower corners of the cores) away from these cores. The depth of the overetch is preferably proportional to the stress in layer 106, e.g., the higher the stress, the higher the etch depth. For example, for a stress less than 10 Mpa, an overetch of 1 µm or less may be adequate. For a stress greater than 10 Mpa, an etch of greater than 1 µm, and up to or over 10 µm, can be used. (This overetch can also be used as a convenient etch transition point for SRG etch as discussed using FIGS. 6A–B below.)

Figure 2D:
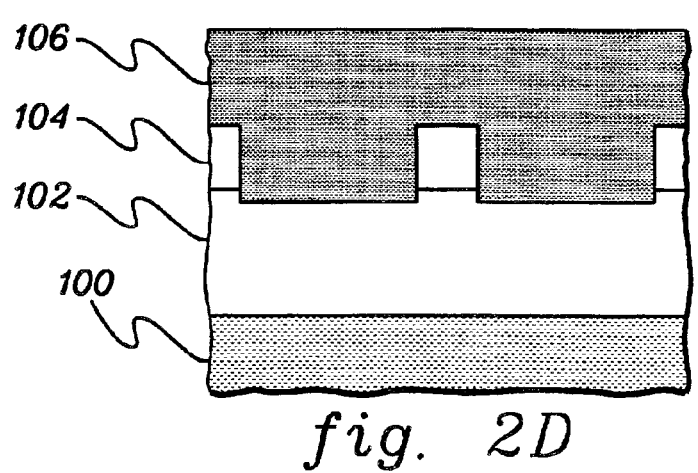

FIG. 2D shows the overcladding layer 106 (e.g., BPSG) deposited over the cores (including into the overetched areas 105).

This overcladding layer 106 may be tailored for stress engineering, as follows: The primary stress in the system results from the CTE mismatch between the silicon layer 100 and the thermal oxide layer 102. For example, the CTE of layer 100 may be on the order of 3.5 parts per million (ppm), and that of layer 102:0.7 ppm. The silicon layer 100 therefore contracts at about five times the rate of the thermal oxide layer 102. Though this stress is highest at this layer interface, the stress field extends to the upper surface of layer 102, to its interface with the cores (which themselves have a CTE of approximately 2.05 ppm).

Varying dopant levels can be used to tune the coefficient of thermal expansion (CTE) of the BPSG layer 106 according to that of the cores/undercladding/substrate. This doping is limited by the point at which the dopants diffuse out and negatively impact the index of refraction of this layer—known to be in the 8 mole percent range To remove this stress field away from the cores, BPSG layer 106 is stress engineered by doping to, e.g., a CTE value of about 3.4 ppm (closer to that of silicon layer 100 −3.5 ppm). By approximately matching the CTE of layer 106 to that of layer 100, a more symmetric stress field in layer 102 is obtained, and the center of that field is effectively moved away from its critical upper interface with the waveguide cores.

In accordance with the present invention, and with reference to FIG. 3, a passivation layer 108 is then deposited over BPSG layer 106, to create a chemical (e.g., vapor) barrier over the waveguides. In one embodiment, this passivation layer is specially tailored to avoid interference with the stress-engineered characteristics of the lower levels. This tailoring involves approximately matching the CTE of the passivation layer 108 to the CTE of the BPSG overcladding layer 106. "Approximately matching" as used herein connotes a CTE match to within about 10%. By using a particular composition, and carefully controlling the variables in the deposition process, this approximate match can be attained. A single passivation layer can be used, or multiple layers, if in their combination they remain compatible with the stress engineering techniques imposed in lower layers.

For example, a silicon nitride film can be used (e.g., $Si_3N_4$) with a thickness of 0.55 µm optimized for stress of approximately −40+/−5 Mpa. A plasma etched chemical vapor deposition (PECVD) process is used, with a deposition rate of approximately 1800 Å/min, 445 watts power@13.5 MHz, 555 watts@2.27 kHz, Ts=400 C, and pressure=3.3 torr. Exemplary deposition flows are: $N_2$=1600 sccm, $SiH_4$=500 sccm, $NH_3$=4000 sccm, with a resultant film refractive index of approximately 2.0350, and CTE of 3.4 ppm, i.e., approximately matched to that of BPSG layer 106. Passivation layer 108 therefore does not add any stress to the previously stress-engineered system over which it is deposited.

Any other suitable passivation materials may be used for layer 108, including for example, hydrogenated silicon nitride of the form $Si_xN_yH_z$; or silicon-oxy-nitride of the form $Si_xO_yN_z$ (with or without hydrogen).

Figure 4A:
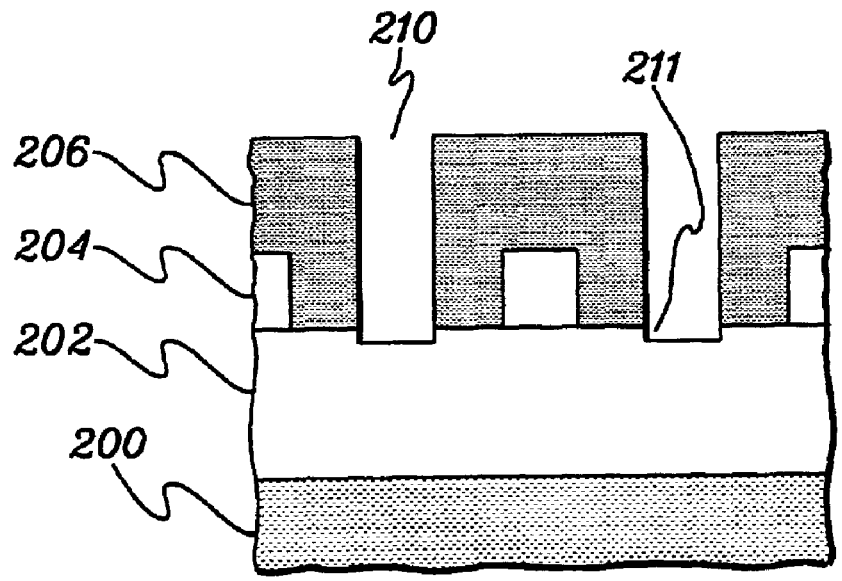
FIGS. 4A–B depict in cross-section a second waveguide configuration of the present invention including a passivation layer combined with stress release grooves between the waveguide cores.
Figure 4B:
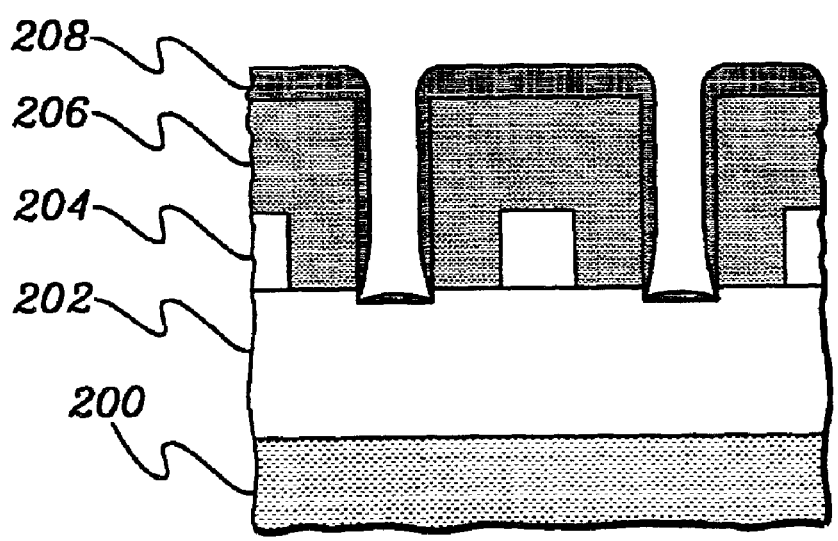

FIGS. 4A–B depict another embodiment of the present invention. Layers 200, 202, 204 and 206 are formed in the same general way discussed above with respect to FIGS. 2A–D. Here, the stress engineering is effected primarily with stress release grooves (SRGs) 210 etched through the BPSG layer 206, between the waveguides. The SRGs can also be overetched into the undercladding layer 202, as in region 211. This overetching has also been shown to offer additional stress relief between adjacent waveguides. SRG overetch can be used separately from, or in addition to, the stress engineering techniques discussed above like core overetch 105 (FIG. 2C) and BPSG layer doping.

In FIG. 4B, a passivation layer 208 is shown added to this structure engineered to maximize the step coverage so that the walls and floor are covered. It is formed to not interfere with any stress engineering, by approximately matching its CTE to that of BPSG layer 206 as discussed above, and also by offering additional barrier protection along the sidewalls and floor of the SRGs (as a relatively thin layer so it does not interfere with the stress relief function of the SRGs).

Figure 5A:
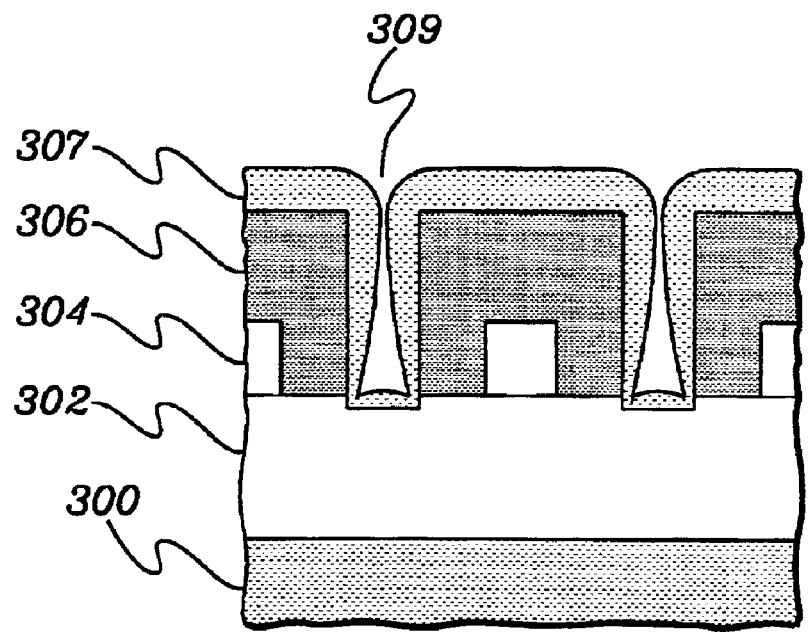
FIGS. 5A–B depict in cross-section a third waveguide configuration of the present invention including buffer and passivation layers, also in combination with stress release grooves between the waveguide cores.
Figure 5B:
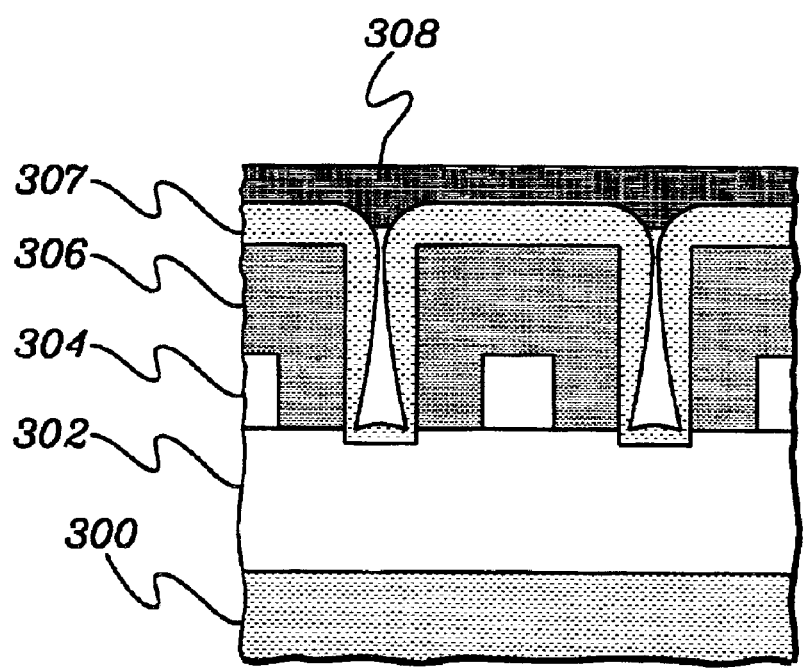

FIGS. 5A–B depict yet another embodiment of the present invention. Layers 300, 302, 304 and 306 are formed in the same general way discussed above with respect to FIGS. 2A–D. Again, the stress engineering is effected primarily with stress release grooves (SRGs) etched through the BPSG layer 306, between the waveguides. As in FIGS. 4A–B, this technique can be used separately from, or in addition to, the stress engineering techniques discussed above like core overetch 105 (FIG. 2C) and BPSG layer doping.

Here an additional buffer layer of undoped silicate glass (USG) 307 is added to the structure. This layer is formed on the upper planar surfaces of the structure, and along the SRG sidewalls and floor. When filling the SRGs, care must be taken to avoid complete fill by leaving a space or cavity 309 between the opposing vertical layers of USG. This cavity ensures the stress release function of the SRGs is maintained. This technique is useful when the core/SRG spacing is small enough to require additional optical buffer space, to avoid SRG interference with the optical performance of the cores.

For example, an undoped silicate glass (USG) can be used with a thickness of 1000 to 1500 Å optimized for stress of approximately −5 to −10 Mpa. A plasma enhanced chemical vapor deposition (PECVD) process is used, with a deposition rate of approximately 3448 Å/min, high frequency RF power of 700 watts, Ts=400 C, and pressure=2.6 torr. Exemplary deposition flows are: $N_2$=2050 sccm, $SiH_4$=260 sccm, $N_2O$=8000 sccm, with a resultant film refractive index of approximately 1.46 to 1.47, and CTE of 3.4 ppm, i.e., approximately matched to that of BPSG layer 306. In this manner, USG layer 107 does not add any stress to the previously stress-engineered system over which it is deposited, and can therefore be relatively thick.

Passivation layer 308 can then be formed over this structure, as discussed above—here engineered to minimize the step coverage. The SRG cavities are controlled to be small enough, so that layer 308 remains generally planar, and only partially fills the cavities, as shown. Using this USG buffer advantageously ensures the integrity of the core optical characteristics; the integrity of the SRG stress release function; and further allows for a generally planar layer of passivation to be formed. This layer can also be relatively thick, if its CTE remains approximately matched to the PSG/BPSG layers immediately below.

Referring back to the passivated embodiments of FIGS. 3 and 5B, this passivation layer (108, 308) may be rather thin, on the order of 0.55 µm. To prevent scratch damage to this barrier layer, it may also be desirable to add an additional layer of USG over this layer using the USG deposition techniques discussed above. USG is known to have more resistance to such physical impacts. Other suitable materials for this additional layer include for example, polyimide; benzocyclobutein (BCB) dielectrics; nitride-oxide-nitride sandwiches; or any polymer based coatings.

In all embodiments, the thicknesses can be, for example, USG: 1000–5000Å, and silicon nitride: 3000–10000 Å.

Figure 6A:
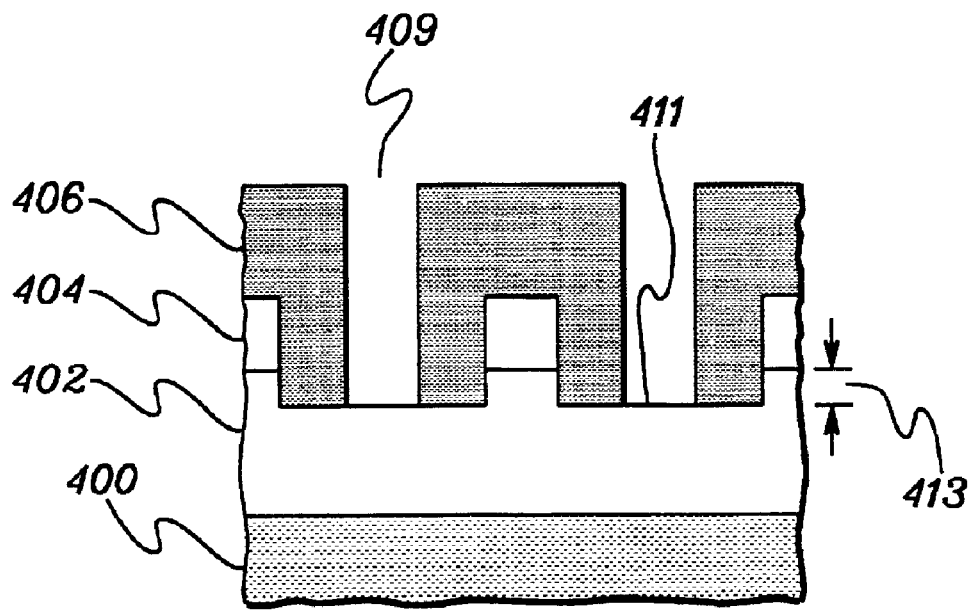
FIGS. 6A–B depict in cross-section a fourth waveguide configuration of the present invention, wherein a waveguide core overetch is used as an etch transition point for stress release groove (SRG) etching.
Figure 6B:
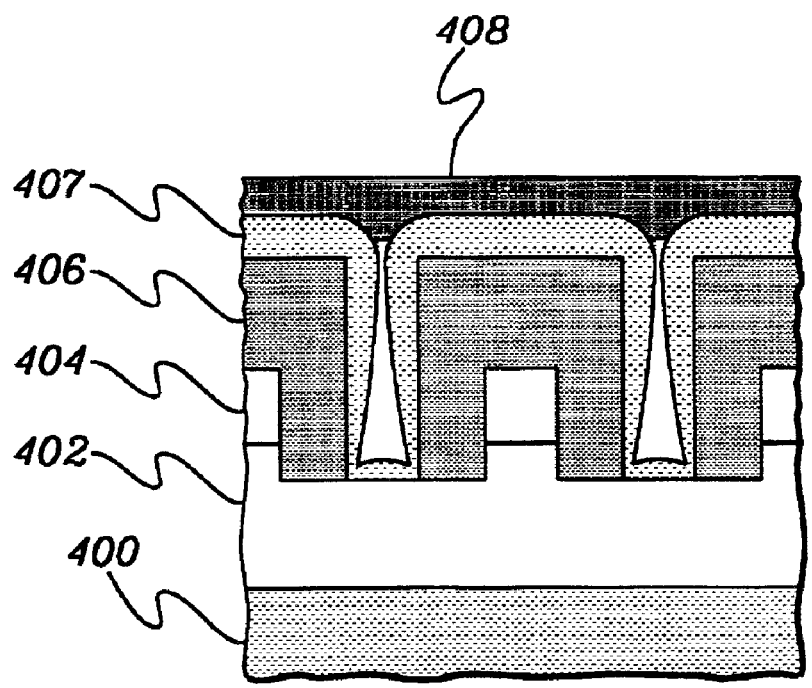

FIGS. 6A–B depict yet another embodiment of the present invention. Layers 400, 402, 404 and 406 are formed in the same general way discussed above with respect to FIGS. 2A–D. Again, the stress engineering is effected primarily with stress release grooves (SRGs) 210 etched through the BPSG layer 306, between the waveguides. As in FIGS. 4A–B, this technique can be used separately from, or in addition to, the stress engineering techniques discussed above like core overetch 105 (FIG. 2C) and BPSG layer doping.

With reference to FIG. 6A, the core overetch proceeds down below the bottom surface of the cores by distance 413. This barrier between the filled BPSG layer 406 and undercladding 402 provides a detectable etch transition point boundary when etching SRGs 409. During SRG etch, this boundary can be detected, therefore providing a highly controllable SRG depth. This SRG depth control is much easier after over-etching the 6 µm cores, than when trying to accurately control the approximately 20 µm SRG etch depth.

As in FIGS. 5A–B, an additional buffer layer of undoped silicate glass (USG) 407 can be optionally added to the structure (FIG. 6B), and passivation layer 408 can then be formed over this structure, providing the same advantages discussed above.

Regardless of the particular selection of stress engineering features, the passivation layer is designed to be non-interfering (i.e., compatible) with their stress balancing properties, while providing all of the benefits of passivation, including its barrier to vapor, chemicals, etc. This barrier protection is becoming increasingly important as optical components are subjected to more adverse environments, and their related reliability standards and testing.

While the invention has been particularly shown and described with reference to preferred embodiment(s) thereof, it will be understood by those skilled in the art that various changes in form and details may be made therein without departing from the spirit and scope of the invention

What is claimed is:

1. A planar lightwave circuit comprising:
   a) a substrate;
   b) at least one optical waveguide core;
   c) an undercladding formed over the substrate and under the core;
   d) at least one feature proximate the core having at least one stress-engineered property to balance stress and therefore minimize birefringence affecting the core, wherein the one feature comprises an overcladding layer formed over the core, and doped to balance stress affecting the core wherein the overcladding is doped to have a coefficient of thermal expansion approximately matched to that of the substrate to thereby symmetrically distribute stress in the undercladding between the overcladding and the substrate, and therefore away from the core; and
   e) a protective passivation layer comprising silicon nitride formed over the core and the feature, the passivation layer having a coefficient of thermal expansion approximately matched to that of the overcladding such that it is substantially non-interfering with the balanced stress affecting the core provided by the overcladding.

2. The planar lightwave circuit of claim 1, wherein overcladding and the passivation layer have a matched CTE and together provide the balanced stress to counter stress within the core, thereby minimizing the overall birefringence.

3. The planar lightwave circuit of claim 1, wherein the at least one feature comprises portions of the undercladding, respectively adjacent to each lower edge of the core, terminating at a point lower than the core, to further effect a removal of stress away from the core.

4. The planar lightwave circuit of claim 1, wherein the at least one feature comprises a stress release groove formed through the overcladding between two cores of the at least one core, the stress release groove releasing and therefore balancing stress affecting the two cores.

5. The planar lightwave circuit of claim 4, wherein the at least one feature comprises portions of the undercladding, respectively adjacent to opposing lower edges of each core, terminating at a point lower than the cores, to further effect a removal of stress away from the cores.

6. The planar lightwave circuit of claim 5, wherein the lower point corresponds with the bottom of the stress release groove to thereby provide an identifiable etch transition point for the stress release groove.

7. The planar lightwave circuit of claim 1, wherein the at least one feature comprises a stress release groove formed through the overcladding between two cores of the at least one core, the stress release groove releasing and therefore balancing stress affecting the two cores.

8. The planar lightwave circuit of claim 1, wherein the at least one feature comprises portions of an undercladding, respectively adjacent to each lower edge of the core, terminating at a point lower than the core, to further effect a removal of stress away from the core.

9. A planar lightwave circuit, comprising:
   a substrate; and
   an undercladding formed over the substrate and under the core;
   at least one optical waveguide core;
   at least one feature proximate the core having at least one stress-engineered property to balance stress and therefore minimize birefringence affecting the core, wherein the at least one feature comprises an overcladding layer formed over the core, and doped to balance stress affecting the core wherein the overcladding is doped to have a coefficient of thermal expansion approximately matched to that of the substrate to thereby symmetrically distribute stress in the undercladding between the overcladding and the substrate, and therefore away from the core, wherein the at least one feature comprises portions of the undercladding, respectively adjacent to each lower edge of the core, terminating at a point lower than the core, to further effect a removal of stress away from the core, wherein the at least one feature comprises a stress release groove formed through the overcladding between two cores of the at least one core, the stress release groove releasing and therefore balancing stress affecting the two cores; wherein a second overcladding is formed along walls and a floor of the stress release groove to partially but not completely fill the groove to preserve its stress releasing property, but sufficient to support a generally planar portion of the passivation layer over the groove; and, a protective passivation layer formed over the core and the feature, the passivation layer formed to be substantially non-interfering with the balanced stress affecting the core provided by the feature, wherein the protective passivation layer comprises silicon nitride and is formed to have a coefficient of thermal expansion approximately matched to that of the overcladding such that it is substantially non-interfering with the balanced stress affecting the core provided by the overcladding.

10. A planar lightwave circuit, comprising:
at least one optical waveguide core;
at least one feature proximate the core having at least one stress-engineered property to balance stress and therefore minimize birefringence affecting the core, said one feature comprising a stress release groove formed through an overcladding between two cores of the at least one core, the stress release groove releasing and therefore balancing stress affecting the two cores; and
a protective passivation layer formed over the core and the feature, the passivation layer formed to be substantially non-interfering with the balanced stress affecting the core provided by the feature, wherein a second overcladding is formed along walls and floor of the stress release groove to partially but not completely fill the groove to preserve its stress releasing property, but sufficient to support a generally planar portion of the passivation layer over the groove.

11. A method for forming a planar lightwave circuit, comprising:
forming at least one optical waveguide core;
providing a substrate and an undercladding formed over the substrate, over which the core is formed;
forming at least one feature proximate the core having at least one stress-engineered property to balance stress and therefore minimize birefringence affecting the core, wherein the step of forming the at least one feature comprises the steps of forming an overcladding layer over the core; and
doping the overcladding to balance stress affecting the core, wherein the overcladding is doped to have a coefficient of thermal expansion approximately matched to that of the substrate to thereby symmetrically distribute stress in the undercladding between the overcladding and the substrate, and therefore away from the core; and forming a protective passivation layer over the core and the feature, the passivation layer formed to be substantially non-interfering with the balanced stress affecting the core provided by the feature, said step of forming the protective passivation layer comprising the step of forming the layer to have a coefficient of thermal expansion approximately matched to that of the overcladding such that it is substantially non-interfering with the balanced stress affecting the core provided by the overcladding, wherein the passivation layer comprises silicon nitride.

12. A method for forming a planar lightwave circuit, comprising:
forming at least one optical waveguide core;
providing a substrate and an undercladding formed over the substrate, over which the core is formed;
forming at least one feature proximate the core having at least one stress-engineered property to balance stress and therefore minimize birefringence affecting the core, wherein the step of forming the at least one feature comprises the steps of forming an overcladding layer over the core; and doping the overcladding to balance stress affecting the core, wherein the overcladding is doped to have a coefficient of thermal expansion approximately matched to that of the substrate to thereby symmetrically distribute stress in the undercladding between the overcladding and the substrate, and therefore away from the core; and
forming a protective passivation layer over the core and the feature, the passivation layer formed to be substantially non-interfering with the balanced stress affecting the core provided by the feature, said step of forming the protective passivation layer comprising the step of forming the layer to have a coefficient of thermal expansion approximately matched to that of the overcladding such that it is substantially non-interfering with the balanced stress affecting the core provided by the overcladding, wherein said forming the at least one feature comprises:
removing portions of the undercladding, respectively adjacent to each lower edge of the core, to a point lower than the core, to further effect a removal of stress away from the core.

13. A method for forming a planar lightwave circuit, comprising:
forming at least one optical waveguide core;
providing a substrate and an undercladding formed over the substrate, over which the core is formed;
forming at least one feature proximate the core having at least one stress-engineered property to balance stress and therefore minimize birefringence affecting the core, wherein the step of forming the at least one feature comprises the steps of forming an overcladding layer over the core; and
doping the overcladding to balance stress affecting the core, wherein the overcladding is doped to have a coefficient of thermal expansion approximately matched to that of the substrate to thereby symmetrically distribute stress in the undercladding between the overcladding and the substrate and therefore away from the core; and
forming a protective passivation layer over the core and the feature the passivation layer formed to be substantially non-interfering with the balanced stress affecting the core provided by the feature, said step of forming the protective passivation layer comprising the step of forming the layer to have a coefficient of thermal expansion approximately matched to that of the overcladding such that it is substantially non-interfering with the balanced stress affecting the core provided by the overcladding, wherein said forming the at least one feature comprises:

forming a stress release groove through the overcladding between two cores of the at least one core, the stress release groove releasing and therefore balancing stress affecting the two cores.

14. The method of claim 13, wherein said forming the at least one feature comprises:

removing portions of the undercladding, respectively adjacent to opposing lower edges of each core, to a point lower than the cores, to further effect a removal of stress away from the cores.

15. The method of claim 14, wherein the lower point corresponds with the desired bottom of the stress release groove, the method further comprising:

using the lower point as an identifiable etch transition point for the stress release groove while forming the stress release groove.

16. A method for forming a planar lightwave circuit, comprising;

a) forming at least one optical waveguide core;

b) forming an overcladding layer over the core;

c) providing a substrate and an undercladding formed over the substrate, over which the core is formed;

d) forming at least one feature proximate the core having at least one stress-engineered property to balance stress and therefore minimize birefringence affecting the core, wherein said forming the at least one feature comprises:

doping the overcladding to balance stress affecting the core, wherein the overcladding is doped to have a coefficient of thermal expansion approximately matched to that of the substrate to thereby symmetrically distribute stress in the undercladding between the overcladding and the substrate, and therefore away from the core; said forming the at least one feature further comprising:

removing portions of the undercladding, respectively adjacent to each lower edge of the core, to a point lower than the core, to further effect a removal of stress away from the core, wherein said forming the at least one feature further comprises: forming a stress release groove through the overcladding between two cores of the at least one core, the stress release groove releasing and therefore balancing stress affecting the two cores;

e) forming a protective passivation layer over the core and the feature, the passivation layer formed to be substantially non-interfering with the balanced stress affecting the core provided by the feature, the passivation layer comprising silicon nitride formed to a coefficient of thermal expansion approximately matched to that of the overcladding such that it is substantially non-interfering with the balanced stress affecting the core provided by the overcladding; and f) forming a second overcladding along walls and floor of the stress release groove to partially but not completely fill the groove to preserve its stress releasing property, but sufficient to support a generally planar portion of the passivation layer over the groove.

17. A method for forming a planar lightwave circuit comprising:

forming at least one optical waveguide core;

providing a substrate and an undercladding formed over the substrate, over which the core is formed;

forming at least one feature proximate the core having at least one stress-engineered property to balance stress and therefore minimize birefringence affecting the core, wherein the step of forming the at least one feature comprises the steps of forming an overcladding layer over the core; and doping the overcladding to balance stress affecting the core, wherein the overcladding is doped to have a coefficient of thermal expansion approximately matched to that of the substrate to thereby symmetrically distribute stress in the undercladding between the overcladding and the substrate, and therefore away from the core; and forming a protective passivation layer over the core and the feature, the passivation layer formed to be substantially non-interfering with the balanced stress affecting the core provided by the feature, said step of forming the protective passivation layer comprising the step of forming the layer to have a coefficient of thermal expansion approximately matched to that of the overcladding such that it is substantially non-interfering with the balanced stress affecting the core provided by the overcladding, wherein said forming the at least one feature comprises:

forming a stress release groove through overcladding between two cores of the at least one core, the stress release groove releasing and therefore balancing stress affecting the two cores.

18. A method for forming a planar lightwave circuit, comprising:

forming at least one optical waveguide core;

providing a substrate and an undercladding formed over the substrate, over which the core is formed;

forming at least one feature proximate the core having at least one stress-engineered property to balance stress and therefore minimize birefringence affecting the core, wherein the step of forming the at least one feature comprises the steps of forming an overcladding layer over the core; and doping the overcladding to balance stress affecting the cores wherein the overcladding is doped to have a coefficient of thermal expansion approximately matched to that of the substrate to thereby symmetrically distribute stress in the undercladding between the overcladding and the substrate, and therefore away from the core, wherein said forming the at least one feature comprises:

forming a stress release groove through overcladding between two cores of the at least one core, the stress release groove releasing and therefore balancing stress affecting the two cores;

forming a protective passivation layer over the core and the feature, the passivation layer formed to be substantially non-interfering with the balanced stress affecting the core provided by the feature, said forming the protective passivation layer comprising the step of forming the layer to have a coefficient of thermal expansion approximately matched to that of the overcladding such that it is substantially non-interfering with the balanced stress affecting the core provided by the overcladding; and, forming a second overcladding along walls and floor of the stress release groove to partially but not completely fill the groove to preserve its stress releasing property, but sufficient to support a generally, planar portion of the passivation layer over the groove.

19. A method for forming a planar lightwave circuit, comprising:
    forming at least one optical waveguide core;
    providing a substrate and an undercladding formed over the substrate, over which the core is formed;
    forming at least one feature proximate the core having at least one stress-engineered property to balance stress and therefore minimize birefringence affecting the core, wherein the step of forming the at least one feature comprises the steps of forming an overcladding layer over the core; and
    doping the overcladding to balance stress affecting the core, wherein the overcladding is doped to have a coefficient of thermal expansion approximately matched to that of the substrate to thereby symmetrically distribute stress in the undercladding between the overcladding and the substrate, and therefore away from the core; and
    forming a protective passivation layer over the core and the feature, the passivation layer formed to be substantially non-interfering with the balanced stress affecting the core provided by the feature, said step of forming the protective passivation layer comprising the step of forming the layer to have a coefficient of thermal expansion approximately matched to that of the overcladding such that it is substantially non-interfering with the balanced stress affecting the core provided by the overcladding, wherein said forming the at least one feature comprising:
        removing portions of an undercladding, respectively adjacent to each lower edge of the core, to a point lower than the core, to further effect a removal of stress away from the core.

20. A method for protecting, and balancing stress in, a planar lightwave circuit having at least one optical waveguide core, comprising:
    using at least one feature proximate the core embodying at least one stress-engineered property to balance stress and
    therefore minimize birefringence affecting the core; and
        using a protective passivation layer over the core and the feature, the passivation layer formed to be substantially non-interfering with the balanced stress affecting the core provided by the feature, wherein said using the feature includes;
    using an overcladding layer over the core, doped to balance stress affecting the cores, wherein the circuit includes a substrate and an undercladding formed over the substrate, over which the core is formed; and wherein the overcladding is doped to have a coefficient of thermal expansion approximately matched to that of the substrate to thereby symmetrically distribute stress in the undercladding between the overcladding and the substrate, and therefore away from the core, wherein the passivation layer has a coefficient of thermal expansion approximately matched to that of the overcladding such that it is substantially non-interfering with the balanced stress affecting the core provided by the overcladding, wherein the passivation layer comprises silicon nitride.

21. A method for protecting, and balancing stress in, a planar lightwave circuit having at least one optical waveguide core, comprising:
    using at least one feature proximate the core embodying at least one stress-engineered property to balance stress and therefore minimize birefringence affecting the core; and
    using a protective passivation layer over the core and the feature, the passivation layer formed to be substantially non-interfering with the balanced stress affecting the core provided by the feature, wherein said using the feature includes:
    using an overcladding layer over the core, doped to balance stress affecting the core wherein the circuit includes a substrate and an undercladding formed over the substrate, over which the core is formed; and wherein the overcladding is doped to have a coefficient of thermal expansion approximately matched to that of the substrate to thereby symmetrically distribute stress in the undercladding between the overcladding and the substrate, and therefore away from the core, wherein the passivation layer has a coefficient of thermal expansion approximately matched to that of the overcladding such that it is substantially non-interfering with the balanced stress affecting the core provided by the overcladding, wherein said using the feature includes:
    using portions of the undercladding, respectively adjacent to each lower edge of the core, which terminate at a point lower than the core, to further effect a removal of the stress away from the core.

22. A method for protecting, and balancing stress in, a planar lightwave circuit having at least one optical waveguide core, comprising:
    using at least one feature proximate the core embodying at least one stress-engineered property to balance stress and therefore minimize birefringence affecting the core; and
    using a protective passivation layer over the core and the feature, the passivation layer formed to be substantially non-interfering with the balanced stress affecting the core provided by the feature, wherein said using the feature includes:
    using an overcladding layer over the core, doped to balance stress affecting the core, wherein the circuit includes a substrate and an undercladding formed over the substrate, over which the core is formed; and
    wherein the overcladding is doped to have a coefficient of thermal expansion approximately matched to that of the substrate to thereby symmetrically distribute stress in the undercladding between the overcladding and the substrate, and therefore away from the core, wherein the passivation layer has a coefficient of thermal expansion approximately matched to that of the overcladding such that it is substantially non-interfering with the balanced stress affecting the core provided by the overcladding, wherein said using the feature includes:
    using a stress release groove formed through the overcladding between two cores of the at least one core, the stress release groove releasing and therefore balancing stress affecting the two cores.

23. The method of claim 22, wherein said using the feature includes:
    using portions of the undercladding, respectively adjacent to opposing lower edges of each core, which terminate at a point lower than the cores, to further effect a removal of stress away from the cores.

24. The method of claim 23, wherein the lower point corresponds with the desired bottom of the stress release groove, to thereby serve as an identifiable etch transition point for the stress release groove.

25. A method for protecting, and balancing stress in, a planar lightwave circuit having at least one optical waveguide core, the circuit including a substrate and an undercladding formed over the substrate, over which the core is formed; wherein an overcladding is doped to have a coefficient of thermal expansion approximately matched to that of the substrate to thereby symmetrically distribute stress in the undercladding between the overcladding and the substrate, and therefore away from the core, the method comprising:

using at least one feature proximate the core embodying at least one stress-engineered property to balance stress and therefore minimize birefringence affecting the core, wherein the feature includes using the overcladding layer over the core, doped to balance stress affecting the core; and using a protective passivation layer over the core and the feature, the passivation layer formed to be substantially non-interfering with the balanced stress affecting the core provided by the feature, wherein the passivation layer is comprised of silicon nitride and has a coefficient of thermal expansion approximately matched to that of the overcladding such that it is substantially non-interfering with the balanced stress affecting the core provided by the overcladding, and wherein said using the feature includes:

using portions of the undercladding, respectively adjacent to each lower edge of the core, which terminate at a point lower than the core, to further effect a removal of the stress away from the core and wherein said using the feature includes:

using a stress release groove formed through the overcladding between two cores of the at least one core, the stress release groove releasing and therefore balancing stress affecting the two cores; and, using a second overcladding along walls and floor of the stress release groove partially but not completely filling the groove to preserve its stress releasing property, but sufficient to support a generally planar portion of the passivation layer over the groove.

26. A method for protecting, and balancing stress in, a planar lightwave circuit having at least one optical waveguide core, comprising:

using at least one feature proximate the core embodying at least one stress-engineered property to balance stress and therefore minimize birefringence affecting the core: and using a protective passivation layer over the core and the feature, the passivation layer formed to be substantially non-interfering with the balanced stress affecting the core provided by the feature, and wherein said using the feature includes:

using a stress release groove through overcladding between two cores of the at least one core, the stress release groove releasing and therefore balancing stress affecting the two cores.

27. A method for protecting, and balancing stress in, a planar lightwave circuit having at least one optical waveguide core, comprising:

using at least one feature proximate the core embodying at least one stress-engineered property to balance stress and therefore minimize birefringence affecting the core, wherein said using the feature includes:

using a stress release groove through overcladding between two cores of the at least one core, the stress release groove releasing and therefore balancing stress affecting the two cores;

using a protective passivation layer over the core and the feature, the passivation layer formed to be substantially non-interfering with the balanced stress affecting the core provided by the feature; and, using a second overcladding along walls and floor of the stress release groove to partially but not completely fill the groove to preserve its stress releasing property, but sufficient to support a generally planar portion of the passivation layer over the groove.

28. A method for protecting, and balancing stress in, a planar lightwave circuit having at least one optical waveguide core, comprising:

using at least one feature proximate the core embodying at least one stress-engineered property to balance stress and therefore minimize birefringence affecting the core; and using a protective passivation layer over the core and the feature, the passivation layer formed to be substantially non-interfering with the balanced stress affecting the core provided by the feature, wherein said using the feature includes:

using portions of an undercladding, respectively adjacent to each lower edge of the core, terminating at a point lower than the core, to further effect a removal of the stress away from the core.

29. A method for forming a stress release groove in a planar lightwave circuit, comprising:

providing a substrate and a waveguide undercladding formed thereover;

forming a waveguide core material layer over the undercladding;

etching portions of the waveguide core material away to form at least two waveguide cores, said etching proceeding into the undercladding between the two cores, to a point lower than the lower surfaces of the cores;

filling the etched portions with a waveguide overcladding; and etching the stress release groove through the overcladding between the cores, and to the lower point, including sensing the lower point as an etch transition point.

* * * * *